Oct. 18, 1932.  J. GUILMETTE  1,883,725
DIFFERENTIAL
Filed July 17, 1931
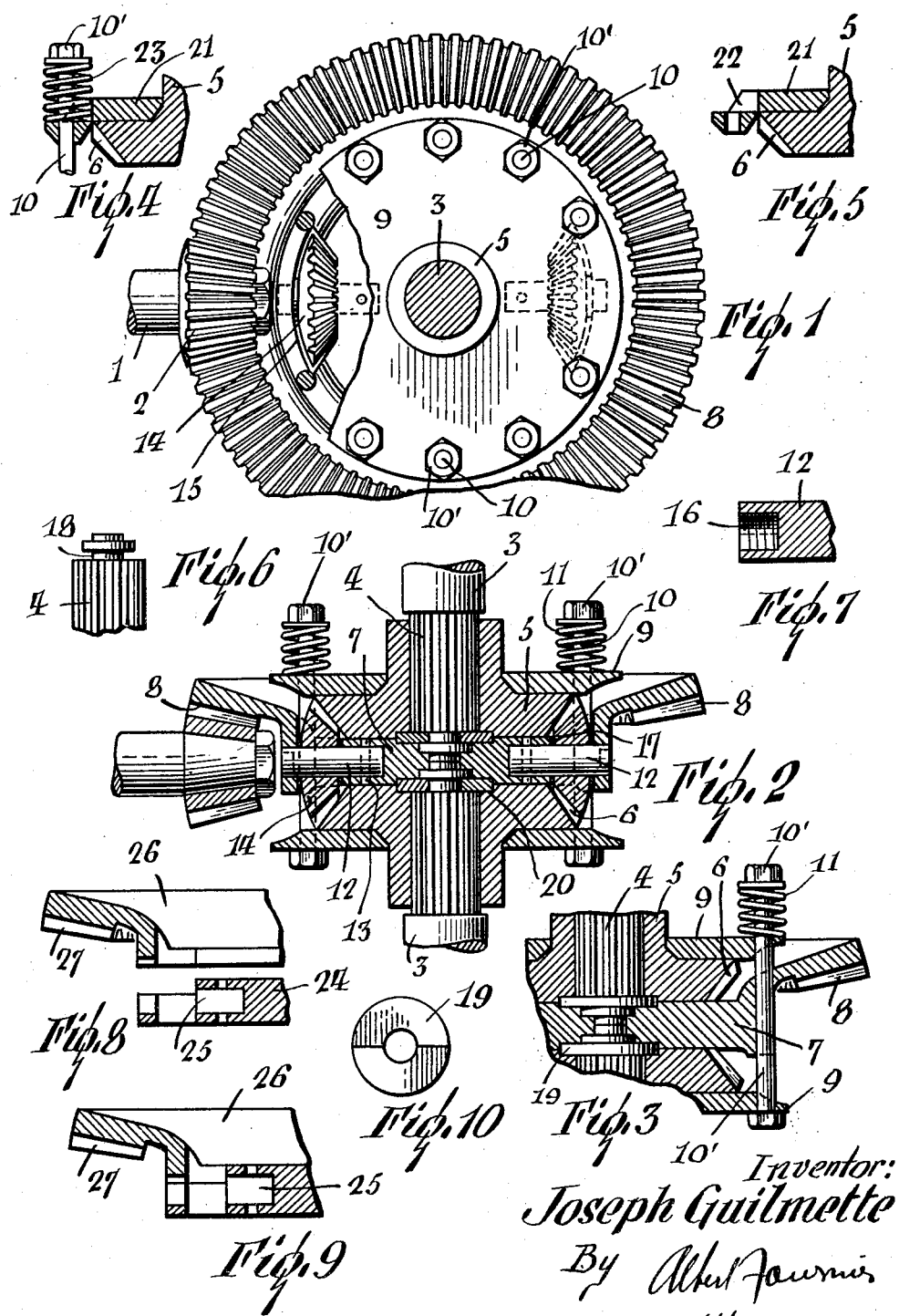
Inventor:
Joseph Guilmette
By Albert Fournier
Attorney Patented Oct. 18, 1932

1,883,725

UNITED STATES PATENT OFFICE

JOSEPH GUILMETTE, OF ST. FELICIEN, QUEBEC, CANADA

DIFFERENTIAL

Application filed July 17, 1931. Serial No. 551,409.

The present invention pertains to a novel differential designed especially for motor vehicles but useful generally in all machines where the sections of a divided axle are likely to run at different speeds.

The principal object of the invention is to eliminate skidding of the wheels due to imperfect assembly. This object is accomplished by the use of superimposed friction disks constituting the opposed differential gears and notched or mortised to accommodate the differential pinions without interrupting the gear teeth of any of the gears.

The frictional engagement of the disks in surface contact is maintained by bolts passed through the disks and surrounded by springs. The springs are adjustable by means of nuts on the bolts, so that the friction may be varied in accordance with running conditions. Thus, the frictional engagement may be adjusted properly for running a vehicle over snow, ice or loose sand, so that proper operation may be obtained under all conditions.

The invention is fully disclosed by way of example in the following description and in the accompanying drawing in which Figure 1 is an elevation of the device, partly broken away;

Figure 2 is a cross section;

Figure 3 is a detail cross section on a different radial plane;

Figure 4 is a detail section of a modification;

Figure 5 is a similar view to Figure 4, with certain parts removed;

Figure 6 is a detail view of the end of an axle;

Figure 7 is a detail section of one of the journals;

Figures 8 and 9 are cross sections of a modified form of crown gear; and

Figure 10 is an elevation of the split washer.

Reference to these views will now be made by use of like characters which are employed to designate corresponding parts throughout.

In Figures 1 and 2 is illustrated a drive or power shaft 1 carrying a pinion 2 by which power is delivered to the differential. The differential embodies a pair of alined axles 3 at right angles to the shaft 1 and connected respectively to certain driven members adapted to turn at different speeds, such as the rear wheels of a motor vehicle, for example. The axles are splined at 4 to receive disks 5 of frictional material, for a purpose which will presently appear, and are formed with peripheral gear teeth 6. Thus, the disks 5 serve also as the crown or large gears of the differential. Between the disks 5 is inserted another friction disk 7 formed as a crown gear 8 meshing with the drive pinion 2.

The outer faces of the disks 5 are engaged by friction plates 9 joined together by bolts 10 passed therethrough. The bolts carry springs 11 engaging one of the plates, whereby the latter are held in yielding frictional contact with the disks 5. The springs are adjustable by nuts 10' on the bolts. A pair of trunnions 12 are inserted diametrically in the intermediate disk 7 and are held by pins 13. On the trunnions are loosely mounted differential pinions 14 accommodated in the angle formed by opposed gear teeth 6 of the disks 5. The disks 7 are further notched or mortised at 15 to receive the pinions, as may be seen by a comparison of Figures 2 and 3. Each pinion meshes with the gear teeth 6 of both disks 5 and delivers the rotation of the crown gear 8 to the disks 5 and axles 3 according to the well known principles of differential operation. The ends of the trunnions are tapped at 16 for engagement by a suitable tool when it is desired to remove them.

Washers 17 are mounted on the trunnions at opposite sides of the pinions 14 for the purpose of adjustment. The inner end of each axle 3 has a peripheral groove 18 to receive a split washer or colar 19 which in turn fits in a recess 20 in the corresponding disk 5. In this manner the axles are held from sliding off the disks 5 after the bolts 10 and springs 11 have been assembled.

In the modification shown in Figures 4 and 5, the outer friction disks 21 are formed with pockets 22 which receive the lower ends of the springs 23. The construction is thus made more compact.

Figures 8 and 9 show a construction wherein the intermediate friction disk is separate from the crown gear, rather than integral therewith as in Figures 1 and 2.

The intermediate friction disks 24 is a flat member having pockets 25 for the trunnions. Upon the disk 24 is laid another circular member 26 formed with bevel gear teeth 27 which constitute the crown gear. The parts are held together by the spring bolts as previously described.

It may now be seen that I have provided a differential having the structural and operating characteristics previously set forth. The mortises for accommodating the pinions do not affect the continuity of any of the gears. The allowable slippage between the friction disks may be regulated by bolts 10' for all running conditions. Otherwise the device has all the gear relations and functional properties of the conventional differential.

Although specific embodiments of the invention have been illustrated and described, it will be understood that various alterations in the details of construction may be made without departing from the scope of the invention as indicated by the appended claims.

What I claim is:

1. A differential comprising a pair of friction disks having peripheral gear teeth, an intermediate friction disk between the first named disks, pinions journalled to said intermediate disk and meshing with said gear teeth, axles keyed to the first named disks and journalled in said intermediate disk, means for driving said intermediate disk, and clamping means holding said disks in mutual surface contact.

2. A differential comprising a pair of friction disks having peripheral gear teeth, an intermediate friction disk between the first named disks, pinions journalled to said intermediate disk and meshing with said gear teeth, axles keyed to the first named disks and journalled in said intermediate disk, a crown gear carried by said intermediate disk, a driving pinion in mesh with said crown gear, and clamping means holding said disks in mutual surface contact.

3. A differential comprising a pair of friction disks having peripheral gear teeth, an intermediate friction disk between the first named disks, pinions journalled to said intermediate disk and meshing with said gear teeth, axles keyed to the first named disks and journalled in said intermediate disk, means for driving said intermediate disk and yielding means holding said disks in mutual surface contact.

4. A differential comprising a pair of friction disks having peripheral gear teeth, an intermediate friction disk between the first named disks, pinions journalled to said intermediate disk and meshing with said gear teeth, axles keyed to the first named disks and journalled in said intermediate disk, means for driving said intermediate disk, bolts passed through said disks, springs on said bolts and engaging one of said disks, and nuts on said bolts for adjusting said springs.

5. A differential comprising a pair of friction disks having peripheral gear teeth, an intermediate friction disk between the first named disks, pinions journalled to said intermediate disk and meshing with said gear teeth, axles keyed to the first named disks and journalled in said intermediate disk, a crown gear carried by said intermediate disk formed with notches accommodating said pinions, and a driving pinion in mesh with said crown gear, and clamping means holding said disks in mutual surface contact.

6. A differential comprising a pair of friction disks having peripheral gear teeth, an intermediate friction disk between the first named disks, pinions journalled to said intermediate disk and meshing with said gear teeth, axles keyed to the first named disks and journalled in said intermediate disk, a crown gear integral with said intermediate disk and formed with notches accommodating said pinions, a driving pinion in mesh with said crown gear, and clamping means holding said disks in mutual surface contact.

In witness whereof I have hereunto set my hand.

JOSEPH GUILMETTE.